(12) United States Patent
Byun et al.

(10) Patent No.: US 10,084,377 B2
(45) Date of Patent: Sep. 25, 2018

(54) BUCK CONVERTER WITH HIGH POWER EFFICIENCY

(71) Applicant: DONGGUK UNIVERSITY INDUSTRY-ACADEMIC COOPERATION FOUNDATION, Seoul (KR)

(72) Inventors: Sang-Jin Byun, Seoul (KR); Chung-Hwan Son, Gyeonggi-do (KR)

(73) Assignee: Dongguk University Industry-Academic Cooperation Foundation, Seoul (KR)

( * ) Notice: Subject to any disclaimer, the term of this patent is extended or adjusted under 35 U.S.C. 154(b) by 0 days.

(21) Appl. No.: 14/966,618

(22) Filed: Dec. 11, 2015

(65) Prior Publication Data

US 2016/0172980 A1  Jun. 16, 2016

(30) Foreign Application Priority Data

Dec. 11, 2014  (KR) .......................... 10-2014-0178769

(51) Int. Cl.
*H02M 3/156* (2006.01)
*H02M 1/00* (2006.01)

(52) U.S. Cl.
CPC .... *H02M 3/156* (2013.01); *H02M 2001/0048* (2013.01); *Y02B 70/1491* (2013.01)

(58) Field of Classification Search
None
See application file for complete search history.

(56) References Cited

U.S. PATENT DOCUMENTS

| | | | |
|---|---|---|---|
| 6,310,467 B1* | 10/2001 | Sauer | G05F 1/575 323/273 |
| 7,501,805 B2 | 3/2009 | Chen | |
| 8,493,049 B2 | 7/2013 | Kwan et al. | |
| 2008/0106917 A1* | 5/2008 | Holt | H02M 3/157 363/26 |
| 2008/0258800 A1* | 10/2008 | Hata | H02M 1/32 327/536 |
| 2014/0062584 A1* | 3/2014 | Kim | G05F 1/563 327/541 |
| 2014/0191744 A1* | 7/2014 | Choi | H02M 3/156 323/283 |
| 2014/0266117 A1* | 9/2014 | Goncalves | H02M 3/158 323/283 |

FOREIGN PATENT DOCUMENTS

| | | |
|---|---|---|
| EP | 0650249 B1 | 10/1999 |
| KR | 1020010049751 A | 6/2001 |
| KR | 1020080021538 | 3/2008 |

* cited by examiner

*Primary Examiner* — Jeffrey Gblende
(74) *Attorney, Agent, or Firm* — Grossman Tucker Perreault & Pfleger, PLLC

(57) ABSTRACT

A buck converter that is efficient in power consumption is disclosed. A buck converter in accordance with an embodiment of the present invention includes an error amplifier and a comparator, at least one of which is powered and operated while a PWM signal is a high signal.

4 Claims, 4 Drawing Sheets

BUCK CONVERTER WITH HIGH POWER EFFICIENCY

CROSS-REFERENCE TO RELATED APPLICATIONS

This application claims the benefit under 35 USC 119(a) of Korean Patent Application No. 10-2014-0178769, filed with the Korean Intellectual Property Office on Dec. 11, 2014, the disclosure of which is incorporated herein by reference in its entirety.

BACKGROUND

1. Field

The following description relates to a buck converter, more specifically to a buck converter that is a voltage converting device for converting a high input voltage to a desired low output voltage.

2. Description of Related Art

Recently, buck converters have been used not only in digital systems, such as digital signal processors (DSP), but also in mixed-mode systems, such as analog-to-digital converters (ADC), digital-to-analog converters (DAC) and wire/wireless communication systems, including both analog circuits and digital circuits, in order to heighten the efficiency of power consumption of these systems. Today, saving power consumption has become an important issue for electronic devices, as a growing number of these electronic devices have become smaller and portable by utilizing a battery for their power source.

As a related art, a buck converter is disclosed in Korea Patent Publication No. 10-2001-0049751 (laid open on Jun. 15, 2001).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a buck converter that is efficient in power consumption.

A buck converter in accordance with an embodiment of the present invention may include an error amplifier that is: powered while a PWM signal ($V_{PWM}$) outputted by a PWM controller is a high signal and not powered while the PWM signal ($V_{PWM}$) is a low signal; and configured to amplify a difference value between the output voltage ($V_{OUT}$) and a reference voltage ($V_{REF}$) while the power is supplied. Moreover, the buck converter in accordance with an embodiment of the present invention may further include a comparator that is: powered while the PWM signal outputted by the PWM controller is a high signal and not powered while the PWM signal is a low signal; configured to compare the output signal of the error amplifier with a ramp signal ($V_{RAMP}$) inputted by an oscillator while power is supplied; and configured to output a compared result as a digital value of a high signal or a low signal.

By periodically supplying power to the error amplifier and the comparator included in the buck converter, it is possible to provide an efficient buck converter that saves an average power consumed by the error amplifier and the comparator.

Other features and aspects will be apparent from the following detailed description, the drawings, and the claims.

DETAILED DESCRIPTION

Hereinafter, a certain embodiment will be described in detail with reference to the accompanying drawings such that the described embodiment can be readily embodied by those who are ordinarily skilled in the art to which the present disclosure pertains. The present disclosure may be realized in a variety of different permutations and shall by no means be restricted the described embodiment. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Figure 1:
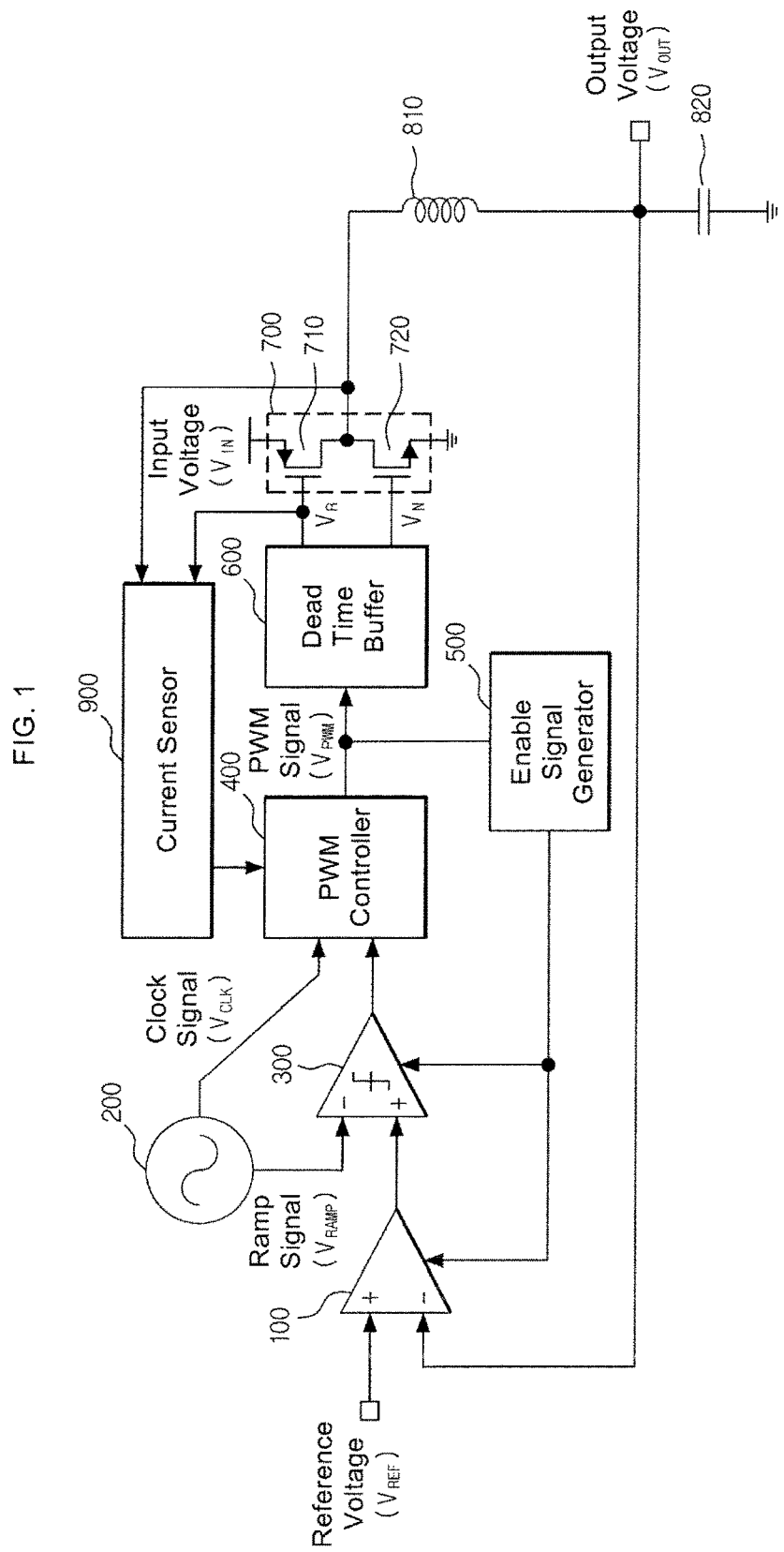
FIG. 1 shows a general configuration of a buck converter in accordance with an embodiment.

FIG. 1 shows a general configuration of a buck converter in accordance with an embodiment.

Referring to FIG. 1, a buck converter in accordance with an embodiment includes an error amplifier 100, an oscillator 200, a comparator 300, a pulse width modulation (PWM) controller 400, an enable signal generator 500, a dead time buffer 600, a switching unit 700, an inductor 810 and a capacitor 820. The buck converter may further include a current sensor 900 in order to prevent an excessive current from flowing to the switching unit 700.

The error amplifier 100 generates an output signal by amplifying a difference value between a reference voltage ($V_{REF}$) and an output voltage ($V_{OUT}$). The error amplifier 100 may be powered on or off according to an enable signal inputted from the enable signal generator 500, which will be described later. The enable signal may be generated when a PWM signal ($V_{PWM}$) generated by the PWM controller 400 is a high signal.

The oscillator 200 outputs a ramp signal ($V_{RAMP}$) and a clock signal ($V_{CLK}$) synchronized to the ramp signal ($V_{RAMP}$).

The comparator 300 compares the output signal generated by the error amplifier 100 with the ramp signal outputted by the oscillator 200, and outputs a compared result as a digital value of a high or low signal. The comparator 300 may be also powered on or off according to the enable signal inputted from the enable signal generator 500. Here, the enable signal may be generated if the PWM signal generated by the PWM controller 400 is a high signal.

The PWM controller 400 generates a PWM signal by receiving the clock signal outputted by the oscillator 200 and the output signal of the comparator 300. Here, the PWM signal may be generated by various ways. For instance, the PWM signal may be generated in such a way that a rising edge of the PWM signal is triggered by a rising edge of the clock signal of the oscillator 200 and a falling edge of the PWM signal is triggered by a falling edge of the output signal of the comparator 300.

The PWM controller 400 generates a PWM signal that determines a time for supplying a current to the inductor 810 through the switching unit 700. If, for example, the PWM signal is a high signal, the PWM controller 400 supplies the current to the inductor 810 through a PMOS power transistor 710. If, on the other hand, the PWM signal is a low signal, the PWM controller 400 supplies the current to the inductor 810 through an NMOS power transistor 720. In other words, the PWM controller 400 may adjust a duty ratio of an output voltage ($V_{OUT}$) to an input voltage ($V_{IN}$) by the PWM signal. Here, defining $T_{ON}$ as the time when the PWM signal is a high signal and $T_{OFF}$ as the time when the PWM signal is a low signal, the duty ratio of the buck converter between the output voltage and the input voltage has a relation shown in the following equation.

$$V_{OUT}/V_{IN}=T_{ON}/(T_{ON}+T_{OFF}) \quad \text{(Equation 1)}$$

The enable signal generator 500 generates an enable signal when the PWM signal outputted by the PWM controller 400 is a high signal. The enable signal generator 500 sends the generated enable signal to the error amplifier 100 and the comparator 300. Therefore, at least one of the error amplifier 100 and the comparator 300 included in the buck converter in accordance with the present invention may be powered on or off according to the enable signal inputted from the enable signal generator 500.

The dead time buffer 600 receives the PWM signal and generates a driving signal for driving the switching unit 700. Here, the driving signal turns off the NMOS power transistor 720 and then turns on the PMOS power transistor 710 if the PWM signal is a high signal, and turns off the PMOS power transistor 710 and then turns on the NMOS power transistor 720 if the PWM signal is a low signal.

The switching unit 700 controls a switch supplying a current to the inductor 810 so as to allow the output voltage to be generated by the input voltage according to the driving signal generated by the dead time buffer 600. The switching unit 700 may include, for example, the PMOS power transistor 710 and the NMOS power transistor 720. The switching unit 700 may have the PMOS power transistor 710 turned on and the NMOS power transistor 720 turned off by the driving signal if, for example, the PWM signal is a high signal. Moreover, the switching unit 700 may have the PMOS power transistor 710 turned off and the NMOS power transistor 720 turned on by the driving signal if, for example, the PWM signal is a low signal.

The current sensor 900 detects a current flowing through the switching unit 700 in order to prevent an excessive current from flowing through the switching unit 700. For instance, the current sensor 900 may detect a drain current of the PMOS power transistor 710 in order to prevent an excessive current from flowing through the PMOS power transistor 710 included in the switching unit 700.

As described above, in the present invention, power is supplied to at least one of the error amplifier 100 and the comparator 300 only when the PWM signal is a high signal because the rising edge of the PWM signal may be triggered by the rising edge of the clock signal ($V_{CLK}$) of the oscillator 200 and the falling edge of the PWM signal may be triggered by the falling edge of the output signal of the comparator 300. In other words, the error amplifier 100 and the comparator 300 may be only operated to generate the falling edge of the PWM signal, and once the falling edge of the PWM signal is generated, the error amplifier 100 and the comparator 300 may not have to be operated using the power. Accordingly, by periodically supplying the power to and allowing at least one of the error amplifier 100 and the comparator 300 to be operated only while the PWM signal is a high signal, the buck converter in accordance with an embodiment of the present invention may save an average power consumed by at least one of the error amplifier 100 and the comparator 300. Therefore, the buck converter in accordance with an embodiment of the present invention is very efficient in power consumption.

Figure 2:
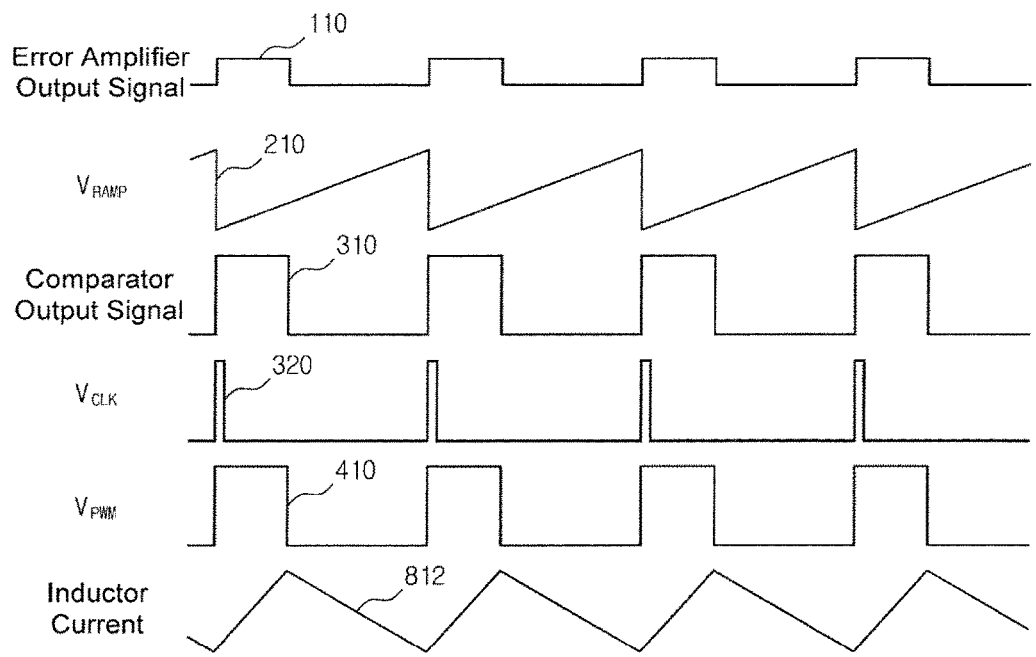
FIG. 2 shows the conceptual waveforms of main building blocks of the buck converter in accordance with an embodiment.

FIG. 2 shows the conceptual waveforms of main building blocks of the buck converter in accordance with an embodiment.

Referring to FIG. 2, an output signal 110 of the error amplifier 100 is outputted while the PWM signal is a high signal. This is because, as described above, power is supplied only if the error amplifier 100 has received an enable signal from the enable signal generator 500.

Next, a ramp signal ($V_{RAMP}$) 210 is outputted by the oscillator 200.

An output signal 310 of the comparator 300 is outputted as a high signal or a low signal based on a result of comparison between the output signal 110 of the error amplifier 100 and the ramp signal ($V_{RAMP}$) 210 of the oscillator 200. Here, the high signal is generated when, for example, the output signal 110 of the error amplifier 100 is greater than the ramp signal ($V_{RAMP}$) 210 outputted by the oscillator 200. Moreover, the output signal 310 of the comparator 300 may be outputted while the PWM signal is a high signal because the comparator 300 is powered according to the enable signal inputted from the enable signal generator 500.

A clock signal ($V_{CLK}$) 320 is outputted by the oscillator 200.

A PWM signal 410 is outputted by the PWM controller 400. The rising edge of the PWM signal 410 may be synchronized with the rising edge of the clock signal ($V_{CLK}$) 320, and the falling edge of the PWM signal 410 may be synchronized with the falling edge of the output signal 310 of the comparator 300.

At least one of the error amplifier 100 and the comparator 300 of the buck converter in accordance with an embodiment of the present invention is powered and operated while the PWM signal is a high signal. Accordingly, it can be seen that at least one of the output signal 110 of the error amplifier 100 and the output signal 310 of the comparator 300 of the buck converter becomes a low signal while the PWM signal is a low signal.

An inductor current 812 is increased when the PWM signal 410 is a high signal and is decreased when the PWM signal 410 is a low signal.

Figure 3:
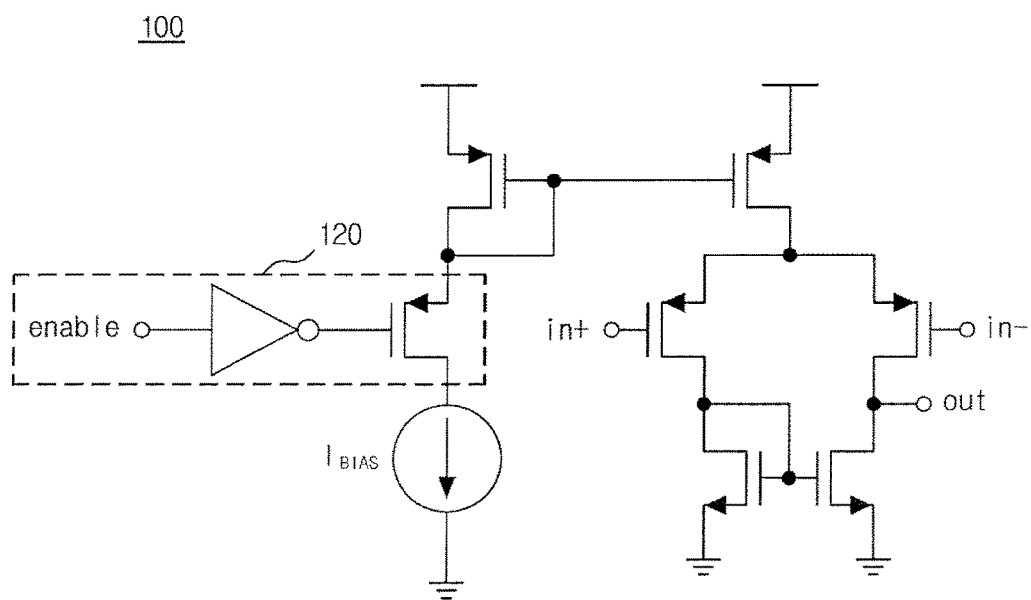
FIG. 3 is a circuit diagram of an error amplifier included in the buck converter in accordance with an embodiment.

FIG. 3 is a circuit diagram of an error amplifier included in the buck converter in accordance with an embodiment.

The error amplifier 100 in accordance with an embodiment of the present invention includes an error amplifier power supply device 120 that receives an enable signal generated by the enable signal generator 500 and supplies power according to the inputted enable signal. The error amplifier power supply device 120 supplies the power to the error amplifier 100 when the enable signal is a high signal and does not supply the power to the error amplifier 100 when the enable signal is a low signal. Here, various embodiments may be included in the error amplifier 100, and various embodiments may be also included in the error amplifier power supply device 120.

Figure 4:
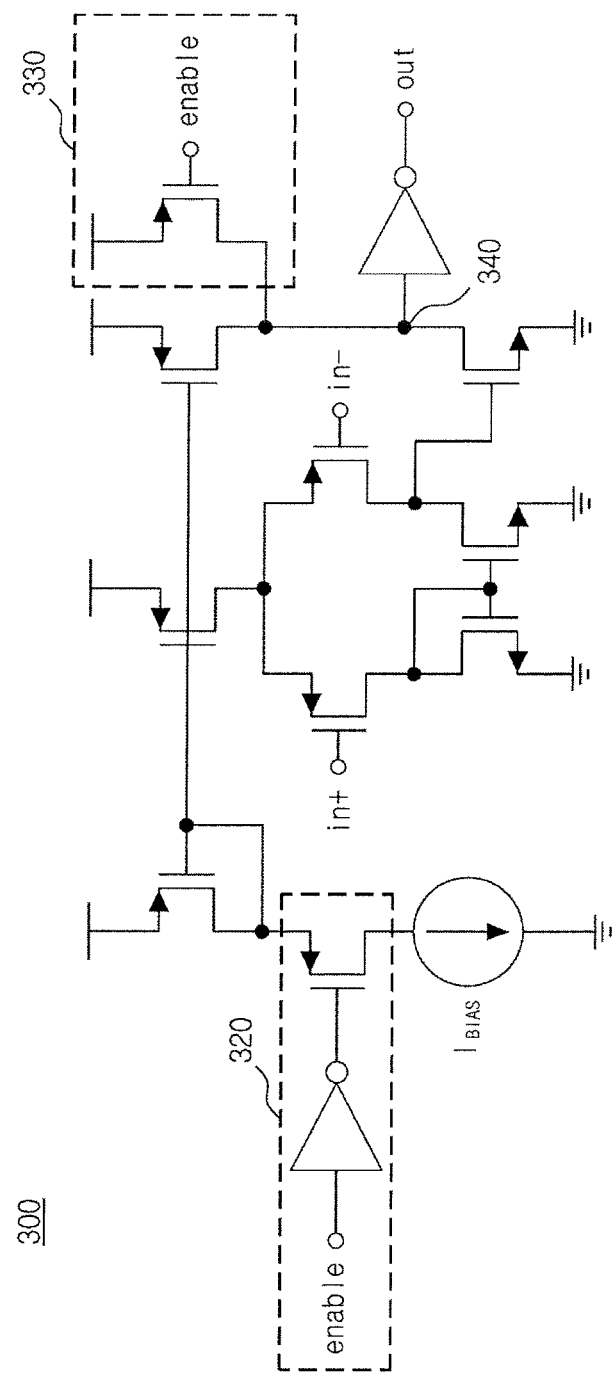
FIG. 4 is a circuit diagram of a comparator included in the buck converter in accordance with an embodiment.

FIG. 4 is a circuit diagram of a comparator included in the buck converter in accordance with an embodiment.

Referring to FIG. 4, the comparator 300 in accordance with an embodiment of the present invention includes a comparator power supply device 320 that receives an enable signal generated by the enable signal generator 500 and supplies power according to the inputted enable signal.

That is, the comparator power supply device 320 supplies the power to the comparator 300 when the enable signal is a high signal and does not supply the power to the comparator 300 when the enable signal is a low signal. Moreover, the comparator 300 may include a comparator voltage locking device 330 that locks a voltage at one node 340 inside the comparator 300 to a high signal in order to allow the comparator 300 to always output a low signal when the enable signal is a low signal.

The comparator voltage locking device 330 may preemptively prevent the possibility that the one node 340 inside the comparator 300 becomes a high impedance node when the enable signal is a low signal. Here, various embodiments may be included in the comparator power supply device 320 and the comparator voltage locking device 330.

Figure 5:
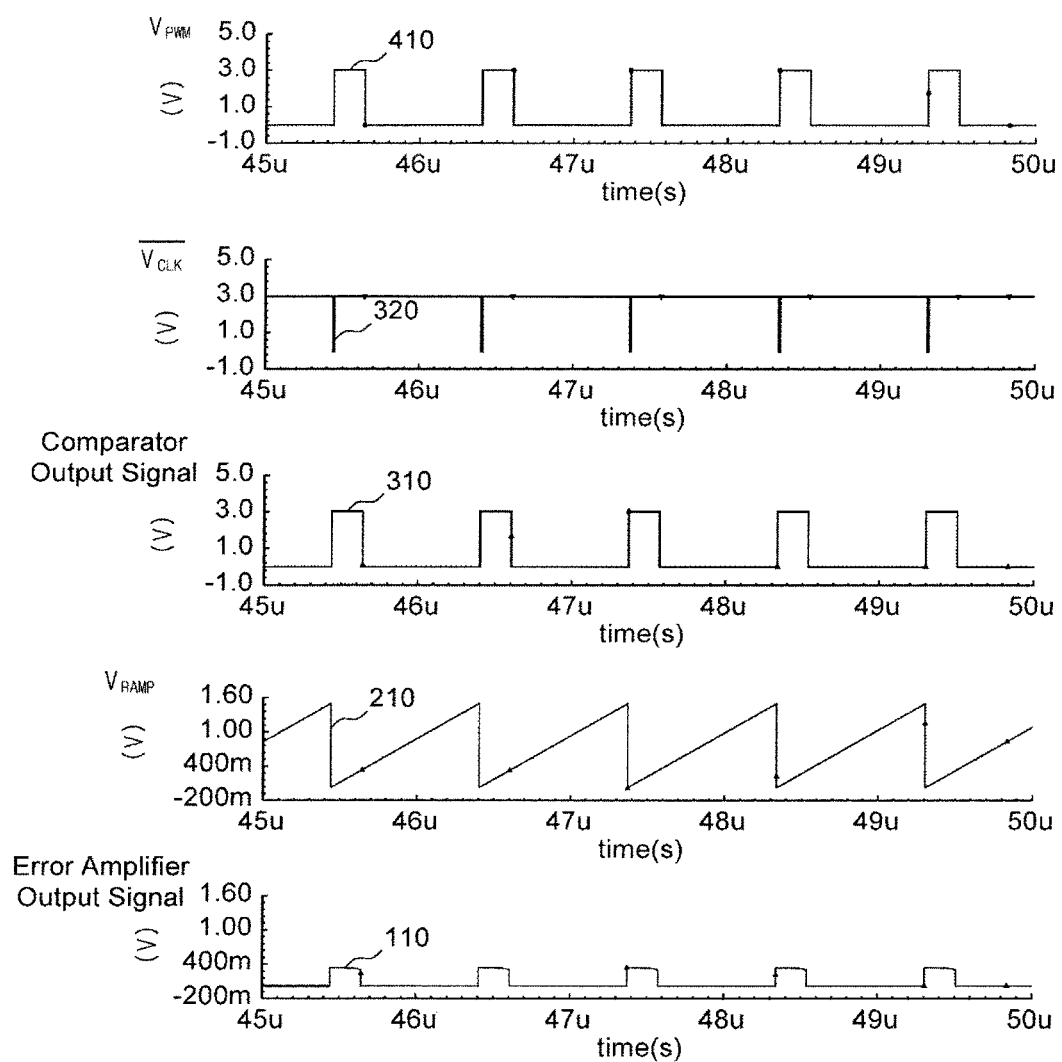
FIG. 5 shows the simulated waveforms of main building blocks of the buck converter in accordance with an embodiment.

FIG. 5 shows the simulated waveforms of main building blocks of the buck converter in accordance with an embodiment.

Referring to FIG. 5, the simulated waveforms of main building blocks of the buck converter in accordance with an embodiment of the present invention coincide with the conceptual waveforms of main building blocks of the buck converter in accordance with the present invention shown in FIG. 2. Since, as described above, the error amplifier 100 and the comparator 300 of the buck converter in accordance with an embodiment of the present invention are powered and operated while the PWM signal 410 is a high signal, it can be seen that the output signals 110, 310 of the corresponding error amplifier 100 and comparator 300 become a low signal while the PWM signal 410 is a low signal.

Since, in the buck converter designed according to the present invention, no power is consumed by the error amplifier 100 and the comparator 300 while the PWM signal 410 is a low signal, it is verified that output efficiencies are increased by about 2.5% from 90.7% to 93.2% when the input voltage is 3 V and the output voltage is 0.6 V.

Although a certain embodiment of the present invention has been described hitherto, it shall be appreciated that various modifications and permutations of the present invention are possible by those of ordinary skill in the art to which the present invention pertains by supplementing, modifying, deleting and/or adding an element or elements without departing from the technical ideas of the present invention, which shall be defined by the claims appended below. Accordingly, it shall be understood that the described embodiment is provided with descriptive purposes, not with restrictive purposes. It shall be also appreciated that such modifications and/or permutations and equivalents thereof are also included in the claimed scope of the present invention.

What is claimed is:

1. A buck converter comprising:
an error amplifier configured to generate an output signal by amplifying a difference value between a reference voltage and an output voltage;
a comparator configured to compare the output signal with a ramp signal outputted by an oscillator and output a compared result as a high signal or a low signal;
a pulse width modulation (PWM) controller configured to generate a PWM signal by receiving a clock signal outputted by the oscillator and an output signal of the comparator; and
an enable signal generator configured to generate an enable signal whose value is high if the PWM signal is a high signal and low if the PWM signal is a low signal and transmit the enable signal to at least one of the error amplifier and the comparator,
wherein the comparator comprises a comparator power supply device configured to supply power to the comparator when the enable signal is a high signal and block the power from being supplied to the comparator when the enable signal is a low signal, and a voltage locking device configured to lock the output signal of the comparator to a low signal if the power is blocked by the enable signal, and
wherein at least one of the error amplifier and the comparator is powered only when the enable signal is high.

2. The buck converter as set forth in claim 1, wherein the error amplifier comprises an error amplifier power supply device configured to supply power to the error amplifier when the enable signal is a high signal and block the power from being supplied to the error amplifier when the enable signal is a low signal.

3. The buck converter as set forth in claim 1, wherein a rising edge of the PWM signal is triggered by a rising edge of the clock signal of the oscillator, and a falling edge of the PWM signal is triggered by a falling edge of the output signal of the comparator.

4. The buck converter as set forth in claim 1, further comprising a switching unit constituted with a PMOS power transistor and an NMOS power transistor, the PMOS power transistor being configured to flow current through an inductor by a driving signal if the PWM signal is a high signal, the NMOS power transistor being configured to flow current through the inductor by the driving signal if the PWM signal is a low signal.

* * * * *